United States Patent [19]
Brewer

[11] Patent Number: 5,289,301
[45] Date of Patent: Feb. 22, 1994

[54] LIQUID CRYSTAL COLOR MODULATION DISPLAYS WITH DYES OF DIFFERENT ORDERS AND CIRCUITRY FOR PROVIDING MODULATED AC EXCITATION VOLTAGE

[75] Inventor: Donald R. Brewer, Vigo County, Ind.

[73] Assignee: Boit, Inc., Terre Haute, Ind.

[21] Appl. No.: 898,917

[22] Filed: Jun. 12, 1992

[51] Int. Cl.$^5$ .................... G02F 1/137; G09F 9/00
[52] U.S. Cl. ............................ 359/98; 359/40; 359/71; 359/85; 362/61; 345/87
[58] Field of Search ............... 359/36, 40, 84, 85, 359/70, 71, 67, 96, 98; 340/701, 704, 784, 792, 793, 805, 811; 362/61, 293, 319

[56] References Cited

U.S. PATENT DOCUMENTS

| | | | |
|---|---|---|---|
| 3,781,088 | 12/1973 | Tsukamoto et al. | 359/84 |
| 3,833,287 | 9/1974 | Taylor et al. | 350/160 |
| 3,864,022 | 2/1975 | Moriyama et al. | 359/98 |
| 3,960,750 | 6/1976 | Moriyama et al. | 359/96 |
| 3,998,510 | 12/1976 | Salisbury | 316/17 |
| 4,035,060 | 7/1977 | Tsunoda et al. | 359/85 |
| 4,325,610 | 4/1982 | Inoue | 350/343 |
| 4,357,374 | 11/1982 | Ogawa | 359/98 |
| 4,360,447 | 11/1982 | Morinaka et al. | 359/98 |
| 4,383,737 | 5/1983 | Hifino et al. | 359/85 |
| 4,390,245 | 6/1983 | Shimizu et al. | 350/343 |
| 4,411,496 | 10/1983 | Nonomura et al. | 359/93 |

(List continued on next page.)

FOREIGN PATENT DOCUMENTS

| | | | |
|---|---|---|---|
| 3240036 | 5/1984 | Fed. Rep. of Germany. | |
| 56-83719 | 7/1981 | Japan | 359/98 |
| 57-49924 | 3/1982 | Japan | 359/98 |
| 2138838 | 10/1984 | United Kingdom. | |
| 8200472 | 2/1982 | World Int. Prop. O. | |

OTHER PUBLICATIONS

"Field-induced Color Switching in Liquid Crystal Displays", M. Schadt, J. Chem. Phys., 71 (6) pp. 2336-2344, 15 Sep. 1979, U.S.A.

(List continued on next page.)

Primary Examiner—William L. Sikes
Assistant Examiner—Tai V. Duong
Attorney, Agent, or Firm—Jack Schuman

[57] ABSTRACT

Liquid crystal display apparatus is disclosed wherein a liquid crystal mixture having incorporated therein (a) a positive order parameter dye and a negative order parameter dye, or (b) a zero order parameter dye and a positive order parameter dye, or (c) a zero order parameter dye and a negative order parameter dye, is interposed between transparent electrodes secured to a transparent superstrate and a transparent substrate. An operating voltage wave ranging between 0 volts and an operating voltage which may be as high as 15.6 volts, and of variable frequency, is applied across the transparent electrodes to produce color changes of adjustable frequency in the liquid crystal mixture. Simultaneously, a square voltage wave of 35 Hz is applied across the transparent electrodes to prevent degradation of the liquid crystal mixture. Various modifications are shown which Produce a travelling wave of color changes of adjustable frequency across the liquid crystal display.

34 Claims, 9 Drawing Sheets

U.S. PATENT DOCUMENTS

| | | | |
|---|---|---|---|
| 4,452,511 | 6/1984 | Huffman | 350/346 |
| 4,506,956 | 3/1985 | Dir | 359/98 |
| 4,556,289 | 12/1985 | Ferguson | 359/51 |
| 4,561,724 | 12/1985 | Otaki et al. | 359/82 |
| 4,581,608 | 4/1986 | Aftergut et al. | 359/84 |
| 4,601,547 | 7/1986 | Shingu | 350/349 |
| 4,616,903 | 10/1986 | Ferguson | 350/334 |
| 4,620,772 | 11/1986 | Sugimoto et al. | 359/63 |
| 4,624,531 | 11/1986 | Wada et al. | 350/340 |
| 4,626,073 | 12/1986 | Amstutz et al. | 359/81 |
| 4,630,894 | 12/1986 | Cremers | 350/338 |
| 4,659,181 | 4/1987 | Mankedick et al. | 359/85 |
| 4,664,479 | 5/1987 | Hiroshi | 359/98 |
| 4,699,470 | 10/1987 | McLaughlin et al. | 359/51 |
| 4,702,559 | 10/1987 | Zondler et al. | 359/82 |
| 4,702,561 | 10/1987 | Huffman | 350/349 |
| 4,707,080 | 11/1987 | Ferguson | 359/51 |
| 4,737,310 | 4/1988 | Imazeki et al. | 359/98 |
| 4,759,611 | 9/1988 | Downey | 359/63 |
| 4,786,268 | 11/1988 | Zondler et al. | 445/25 |
| 4,834,508 | 5/1989 | Ferguson | 350/339 |
| 4,838,659 | 6/1989 | Van Ewyle et al. | 359/97 |
| 4,878,741 | 11/1989 | Ferguson | 350/339 |
| 4,886,343 | 12/1989 | Johnson | 359/53 |
| 4,922,239 | 5/1990 | Kugo et al. | 359/68 |
| 4,935,160 | 6/1990 | Schemble et al. | 359/98 |
| 4,948,232 | 8/1990 | Lange | 350/334 |
| 4,950,052 | 8/1990 | Ferguson | 359/51 |
| 4,953,953 | 9/1990 | Ferguson | 359/51 |
| 4,957,350 | 8/1990 | Ito et al. | 359/68 |
| 4,985,816 | 1/1991 | Seko et al. | 362/61 |
| 5,015,074 | 5/1991 | Clerc et al. | 359/53 |
| 5,026,505 | 8/1991 | Kaneko et al. | 359/98 |
| 5,228,767 | 7/1993 | Johnson | 362/61 |

OTHER PUBLICATIONS

"Anthraguinone Dyes Exhibiting the Negative Dichroism in Liquid Crystals", A. V. Ivasheako et al., Mol. Cryst. Liq. Cryst., vol. 129, pp. 277–283, 1985, U.S.A.

"New Absorptive Mode Reflective Liquid-Crystal Display Device", D. L. White et al., Journal of Applied Physics, vol. 45, No. 11, pp. 4718–4723, Nov. 1874, U.S.A.

"Dyes in Liquid Crystals", A. V. Ivashenko et al., Molecular Crystals and Liquid Crystals, Sep. 1987, U.S.A., pp. 106–126.

"Flexible LDD is Lighter and Thinner than Glass", J. D. Mosely, EDN, Oct. 31, 1985, p. 93.

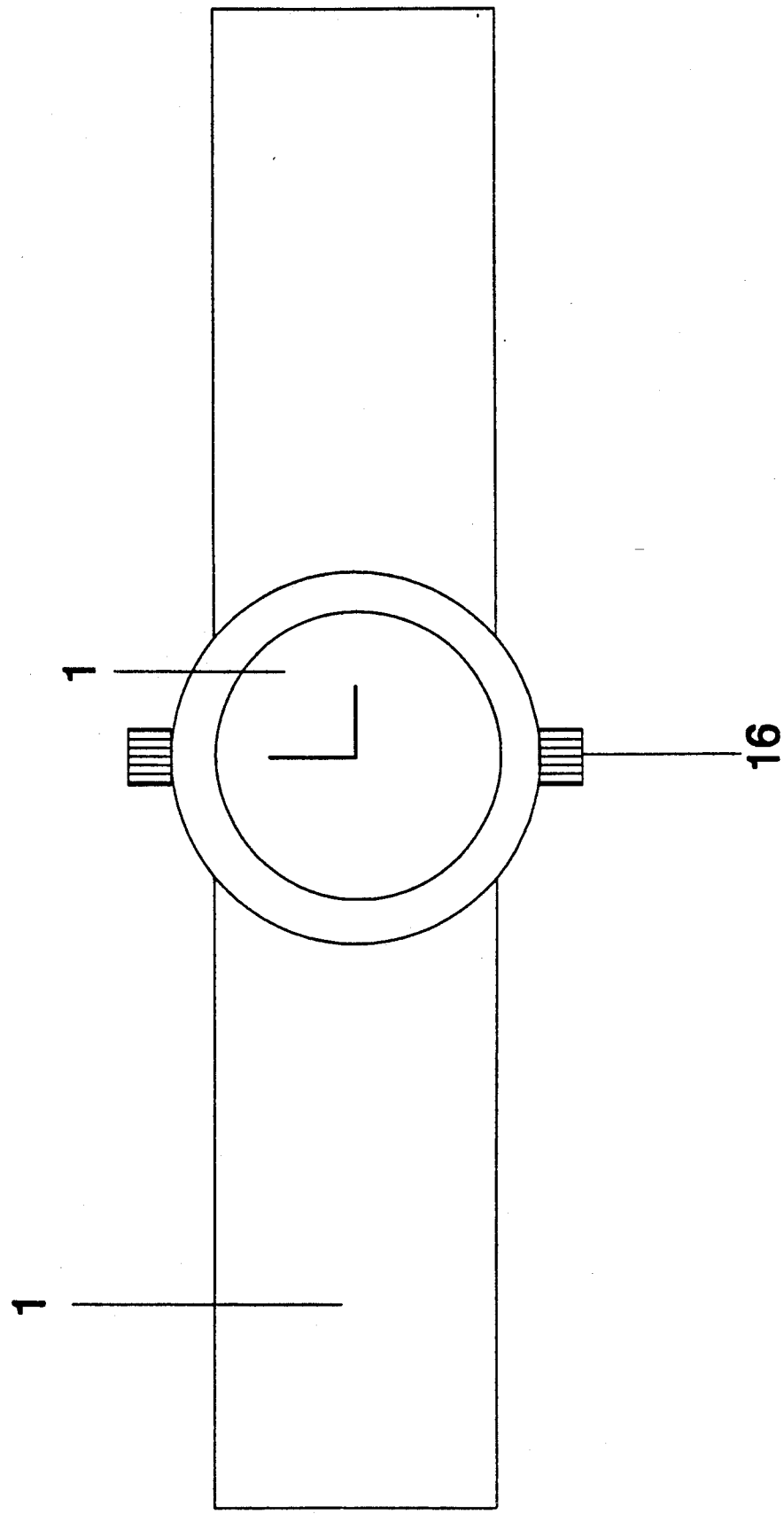

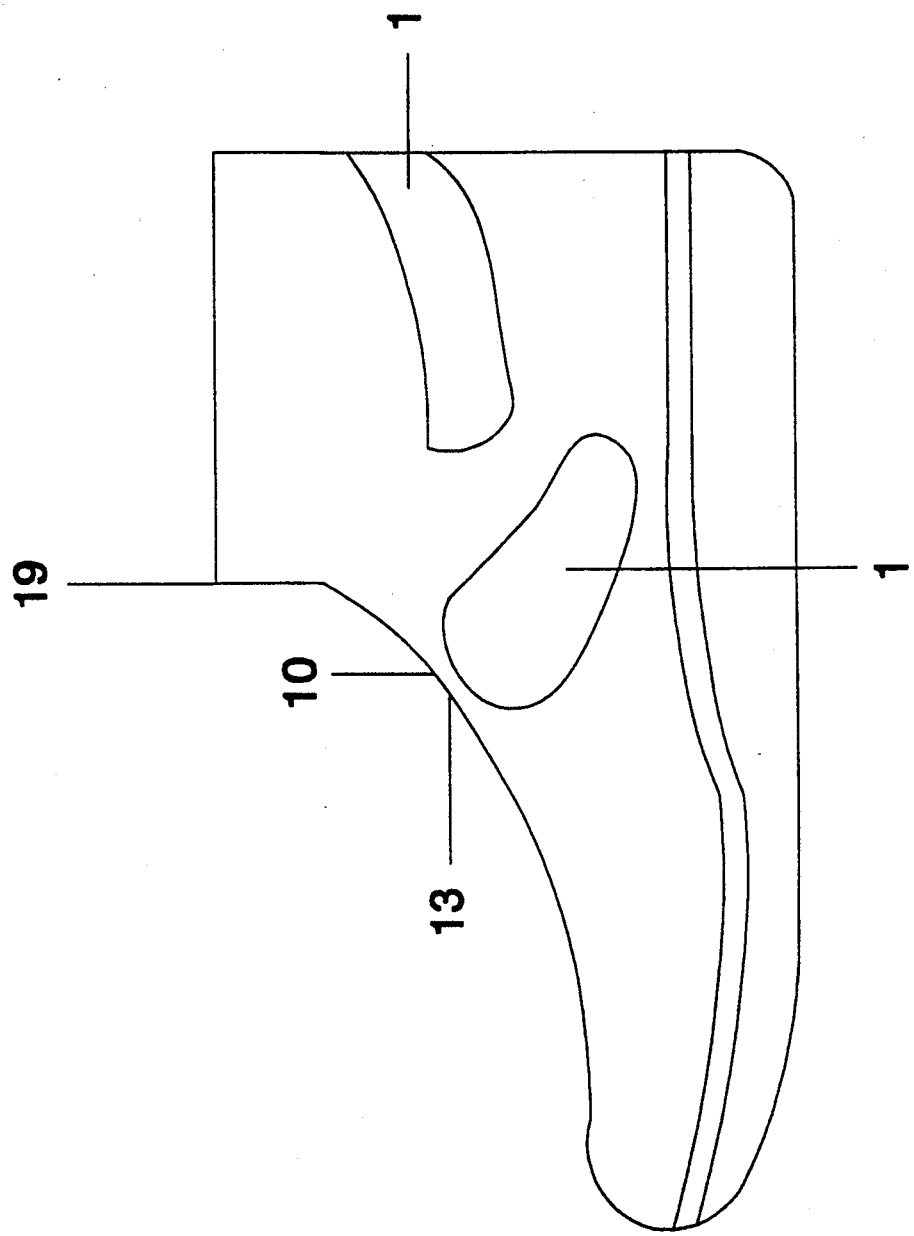

FIG. 9

| | |
|---|---|
| C1, C2, C3, C4, C5, C6 | 10 F, 15V Capacitor |
| D1, D2, D3, D4, D5, D6 | Any diode, low forward voltage drop |
| R1 | 470 Ω |
| R2 | 82 KΩ |
| R3 | 10 KΩ |
| C7 | 10 μF |
| R4 | 0-330 KΩ |
| R5 | 82 KΩ |
| R6 | 10 KΩ |
| C8 | 10 μF |
| R7 | 1 KΩ |
| R8 | 2 KΩ |
| | |
| U1, U2, U3 | Harris ICL76602 Super voltage converter |
| U4, U5 | Harris ICL8038 Precision waveform generator/ voltage controlled oscillator |
| U6 | 741 Operational Amplifier |

LIQUID CRYSTAL COLOR MODULATION DISPLAYS WITH DYES OF DIFFERENT ORDERS AND CIRCUITRY FOR PROVIDING MODULATED AC EXCITATION VOLTAGE

BACKGROUND OF THE INVENTION (1) Field of the Invention

This invention relates, broadly speaking, to novel liquid crystal displays.

More particularly, this invention relates to novel liquid crystal color modulation displays and operating electronic circuitry capable of exhibiting colors over a range of colors, which colors can be changed as desired within said range to create novel aesthetic effects. Said liquid crystal color modulation displays can, for example, be embodied in a cell construction, such as a flexible plastic cell, which in turn can be secured by any suitable means to objects such as articles of clothing, watches, automobiles, furniture, walls and the like.

(2) Description of the Prior Art

Liquid crystal displays, used for example in watches and television screens, are well known in the art.

"Field-Induced Color Switching in Liquid Crystal Displays," M. Schadt, J.Chem.Phys. 71(6), Sept. 15, 1979, pp. 2336-2344, discloses a liquid crystal guest-host effect which modulates color intensity, and its color changes upon the application of a voltage.

U.S. Pat. No. 4,702,561 (1987) discloses a guest-host display with pleochroic dyes, containing negative and positive order dyes to produce a change of color from one to another.

U.S Pat. No. 3,833,287 (1974) discloses a thin film liquid crystal device employing the guest-host principle, in which unpolarized light is selectively absorbed. In the absence of an electrical field across the thin film, virtually all the unpolarized light is absorbed by the film. When an electric field is applied to the film, none of the unpolarized light is absorbed. This device can be used for displays.

U.S. Pat. No. 4,759,611 discloses a flexible plastic cell enclosing guest-host material in which the color can be changed according to applied voltage. An oscillator control circuit changes the color at the desired frequency.

U.S. Pat. Nos. 4,834,508 (1989), 4,878,741 (1989) and 4,953,953 (1990) each discloses a liquid crystal cell acting as a color filter and used in information displays.

U.S. Pat. No. 4,390,245 (1983) discloses an optical display cell comprising liquid crystal material held within spaced substrates. Spacers are provided between the substrates to maintain a uniform distance therebetween.

U.K. Patent No. 2,138,838 (1984) discloses a guest-host liquid crystal material having a dye with a negative order parameter which goes from colorless to color under applied voltage.

U.S. Pat. Nos. 4,624,531 (1986) discloses a guest-host display to produce colored symbols on a colorless background.

U.S. Pat. No. 5,026,505 (1991) discloses a guest-host display.

U.S. Pat. No. 4,838,659 (1989) discloses a guest-host display using fluorescent dyes. The guest-host display modulates the color and the fluorescense of the dye.

U.S. Pat. No. 4,957,350 (1990) discloses a liquid crystal display device that uses red, green and blue striped cells serving as color filters.

U.S. Pat. No. 5,015,074 (1991) discloses a display device filled with different dyes in a liquid crystal host.

U.S. Pat. No. 4,630,894 (1986) discloses a multi-colored liquid crystal display with a color transreflector and color filter.

U.S. Pat. No. 4,922,239 (1990) discloses a multi-shade color liquid crystal display apparatus using several color filters to produce shading variations of one color.

U.S. Pat. No. 4,664,479 (1987) discloses the use of a guest-host material to turn a mirror into a non-reflective display.

U.S. Pat. No. 4,935,160 (1990) discloses a liquid crystal guest-host system employing several pleochroic dyes, and is designed for informational display using different layers of the guest-host mixtures.

U.S. Pat. Nos. 4,707,080 (1987), 4,616,903 (1986), 4,556,289 (1986), 4,506,956 (1985), 4,886,343 (1989), 4,601,547 (1986) and 4,737,610 (1988) disclose various liquid crystal displays.

SUMMARY OF THE INVENTION

One of the objects of this invention is to provide a novel liquid crystal modulation display and operating electronic circuitry.

Other and further objects of this invention will become apparent by reference to the accompanying specification and drawings, and to the appended claims.

Briefly, I have discovered that, by preparing a liquid crystal guest-host mixture comprising a negative order parameter dye and a positive order parameter dye, or comprising a negative order parameter dye and a zero order parameter dye, or a positive order parameter dye and a zero order parameter dye, upon application of a voltage of varying value and/or frequency, novel aesthetic effects may be obtained.

DESCRIPTION OF THE DRAWINGS

Referring now to the drawings, in which like numerals represent like parts in the several views:

FIG. 4 represents a view of the front of a watch embodying the present invention.

FIG. 5 represents a view in side elevation of an article of footwear embodying the present invention.

FIG. 9 provides the values for the resistors and capacitors and identifies the semiconductors used in the integrated circuit of FIG. 8.

DESCRIPTION OF THE PREFERRED EMBODIMENTS

Figure 1:
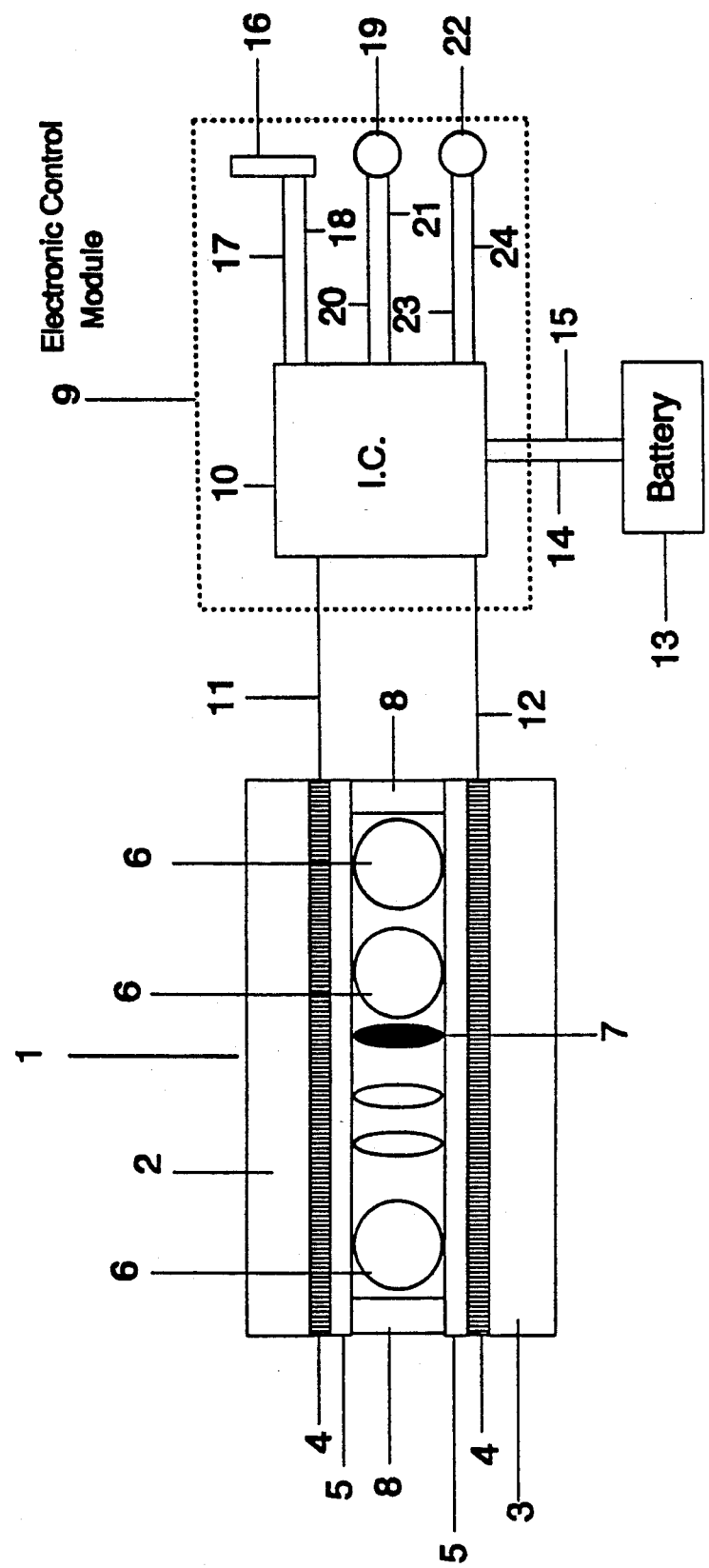
FIG. 1 represents a transverse section of a liquid crystal color modulation display showing diagrammatically the power unit for selecting and/or oscillating the color exhibited by the display.

The display cell 1 shown in FIG. 1 comprises superstrate 2 and substrate 3 constituting the two faces thereof. Superstrate 2 and substrate 3 are, in the preferred embodiment, flexible and may be fabricated from such plastic materials as polycarbonates, acrylics and polyesters.

Superstrate 2 is transparent, and may be provided with ultraviolet (UV) blockants to extend the lives of materials in the display cell 1 which otherwise would degrade as a result of exposure to ultraviolet light UV blockants are well known in the art.

Substrate 3 may be provided with a reflective surface consisting, for example, of a film of aluminum, silver, gold or the like deposited on the exterior surface thereof to achieve high reflectance or may be dyed a color such as white. Alternatively, substrate 3 may be provided with a transreflective coating which would allow backlighting for good optical appearance in low lighting conditions. Such transreflective coatings are well known in the art. Substrate 3 may also be transparent.

Transparent electrodes 4, which may be films of indium-tin-oxide (ITO), tin oxide, or other suitable conductive material, are deposited on the interior surfaces of superstrate 2 and substrate 3.

Thin polymer layers 5 may be deposited on the interior surfaces of transparent electrodes 4. The purpose of the thin polymer layers 5 is to align the liquid crystals, hereinafter to be described, homogeneously or homeotropically, the choice of which type of alignment being dependent upon the desired application and contents of the cell. The terms "homogeneously" and "homeotropically" are well known in the art and need not be explained herein.

Spacers 6 are interposed between superstrate 2 and substrate 3 to maintain a fixed desired spacing therebetween. Spacers 6 may be plastic spheres or fibers, glass beads or fibers, stainless steel discs and the like.

Advantageously, particulate spacers 6 are mixed with a suitable adhesive, the resulting mixture being randomly particulate with a dimension small enough to be unresolvable and distributed between superstrate 2 and substrate 3. The advantages attaching to use of such spacer-adhesive mixture are two-fold. Firstly, in flexible liquid crystal displays that are subject to frequent bending, spacers interposed between the faces of the display cell migrate from stressed areas to unstressed areas in the cell. Because of such migration, areas under stress frequently lack sufficient spacers, and unstressed areas to which the spacers may migrate will have an overabundance of spacers resulting in observable optical effects which may be undesirable. Use of the spacer-adhesive mixture, on the other hand, holds the spacer particulates in place so that such spacer particulates do not shift position when the display cell is flexed, unlike conventional display cells that have freely moving spacers.

Secondly, use of the spacer-adhesive mixture solves a well-known problem encountered in conventional liquid crystal displays. In this art, it is known that there is a limitation on the height of a display cell that can be fabricated. In display cells with height exceeding this limitation, the effect of gravity on the liquid crystal forces the faces of the display cell sufficiently apart to produce a visible cell thickness variation. By employing the spacer-adhesive mixture between superstrate 2 and substrate 3 at a dimension that cannot be resolved, a liquid crystal display 1 having a substantially larger height than conventional liquid crystal displays can be constructed.

The mixture 7 of liquid crystals with appropriate dyes is positioned between superstrate 2 and substrate 3, the thickness thereof being determined by the dimensions of the spacers 6 or spacer particulates, as the case may be, in the spacer-adhesive mixture.

Mixture 7 is a guest-host combination, the host portion being liquid crystal material selected from the group consisting of nematic, cholesteric, and combinations of nematic and cholesteric liquid crystals, in liquid form or encapsulated in a polymer.

In a guest-host mixture, the guest dye molecules assume the molecular orientation of the host liquid crystals. When a voltage is applied across a liquid crystal display, the molecular orientation of the host liquid crystals is reoriented with respect to the faces of the display, i.e., with respect to superstrate 2 and substrate 3. The guest dye molecules in the host liquid crystals are forced to change their orientation together with the change in orientation of the host liquid crystals. A change in orientation of the guest dye molecules may produce a change in the apparent color of the guest dye.

Guest dyes can exhibit a positive order parameter, a negative order parameter, or a zero order parameter. Order parameter indicates where the polarization axis of the dye lies with respect to incident light.

A guest dye with a positive order parameter in a guest-host mixture in a liquid crystal display exhibits a change in color from color to colorless when the voltage applied across the display is raised from zero volts.

A guest dye with a negative order parameter in a guest-host mixture in a liquid crystal display exhibits a change in color from colorless to color when the voltage applied across the display is raised from zero volts.

A guest dye with a zero order parameter does not exhibit any change in color when the voltage applied across the display is varied, but rather will remain constant in color regardless of variations in applied voltage.

The present invention is based in part on the well-known fact that, when the guest portion of a guest-host mixture in a liquid crystal display is a combination of guest dyes having positive order parameters and guest dyes having negative order parameters, a display which changes from one color to another color upon application or removal of a voltage across the display can be realized.

The guest portion of mixture 7 is a combination of several preferably pleochroic dyes including (a) positive order parameter and negative order parameter dyes, or (b) positive order parameter and zero order parameter dyes, or (o) negative order parameter dyes and zero order parameter dyes. The color of the negative order parameter dye when a voltage is applied across the display cell 1 must be different than the color of the positive order parameter dye or the zero order parameter dye (as the case may be) when no voltage is applied across the display cell 1. Similarly, the color of the positive order parameter dye when no voltage is applied across the display cell 1 must be different than the color of the zero order parameter dye.

Guest dyes with positive order parameters, with negative order parameters, and with zero order parameters ar well-known in this art, and need not be specifically identified. Such dyes can readily be selected by the designer of the display to attain the desired color changes.

Peripheral seal 8, which may be an adhesive, epoxy, laminate, heat-sealable material, melted material or the like, hermetically seals the display cell 1 around its edges.

Electronic control module 9 comprises integrated circuit 10 electrically connected through lines 11 and 12 to transparent electrodes 4 on superstrate 2 and substrate 3 respectively, battery 13 or other suitable source of EMF powering integrated circuit 10 through lines 14 and 15, switch 16 electrically connected to integrated circuit 10 through lines 17 and 18, variable potentiometer 19 electrically connected to integrated circuit 10 through lines 20 and 21, and variable potentiometer 22 electrically connected to integrated circuit 10 through lines 23 and 24.

Integrated circuit 10 may be a 555 timer chip well-known in this art, delivering a 35 Hz AC square wave voltage to the display cell 1 to prevent degradation of the liquid crystal material contained therein, and also delivering, superimposed over the 35 Hz AC square wave, a variable root mean square (RMS) voltage ranging between 0 volts and 6 volts.

Switch 16 selectively activates or deactivates the display cell 1.

Variable potentiometer 19 varies the magnitude of the RMS voltage output of the integrated circuit 10 and permits the user of the display cell 1 to select the desired color by adjusting the RMS voltage applied across the display cell 1.

Variable potentiometer 22 varies the frequency of the RMS voltage output of the integrated circuit 10 and permits the user of the display cell 1 to adjust the frequency of the color changes in the display cell 1.

In operating the display cell 1 shown in FIGURE 1, the user closes switch 16 and operates variable potentiometer 19 to control the magnitude of the RMS voltage delivered by integrated circuit 10 across the display cell from 0 volts to 6 volts. When the dyes in the liquid crystal guest-host mixture are positive and negative order parameter dyes, at 0 volts, the negative order parameter dye is colorless and the positive order parameter dye is at full color, at 6 volts, the negative order parameter dye is at full color and the positive order parameter dye is colorless, and at voltages intermediate between 0 volts and 6 volts, both positive and negative order parameter dyes are partially colored (between colorless and full color) at the same time, and the resulting color exhibited by the display cell 1 will be a combination of the partially colored dyes. If, for example, one dye at full color is blue, and the other dye at full color is yellow, various shades of green will result at voltages intermediate 0 volts and 6 volts.

When the dyes in the liquid crystal guest-host mixture are positive and zero order parameter dyes, at 0 volts the positive order parameter dye is at full color and the zero order dye is at constant full color. The resulting color exhibited by the display cell 1 will be a combination of the full color of the positive order parameter dye and the constant color of the zero order parameter dye. Thus, if the positive order parameter dye at full color is blue, and the constant color of the zero order parameter dye is yellow, at 0 volts applied voltage, the color exhibited will be a combination of blue and yellow, namely green. As the applied voltage across the display cell 1 is raised, the green color will become lighter, namely more yellowish, and at full voltage across the display cell 1, the color thereof will be yellow.

When the dyes in the liquid crystal guest-host mixture are negative and zero order parameter dyes, at 0 volts the negative order parameter dye is colorless and the zero order parameter dye is at constant full value. The resulting color exhibited by the display cell 1 will be the color of the zero order parameter dye. When the voltage applied across display cell 1 is raised to full operating value, the resulting color exhibited by the display cell 1 will be a combination of the full color of the negative order parameter dye and the constant color of the zero order parameter dye. Thus, if the negative order parameter dye at full color is blue, and the constant color of the positive order parameter dye is yellow, at 0 volts applied voltage, the color exhibited will be yellow. As the applied voltage across the display cell 1 is raised to full voltage, the yellow color will change to increasing deeper shades of green.

By adjusting variable potentiometer 19, thereby to adjust the voltage applied across display cell 1, the user can select from the range of colors at full value of the dyes in the liquid crystal guest-host mixture the color to be exhibited by the display cell 1.

The user can also select the frequency of voltage oscillations to the RMS voltage delivered by integrated circuit 10 across the display cell 1 by adjusting variable potentiometer 22. Oscillations in RMS voltage across the display cell between 0 volts and 6 volts will result in oscillations of color between the full color of one dye and the full color of the other dye and across blended colors between the two extreme full colors. In this manner, the user can select the frequency of color changes in the display cell 1 to attain the desired aesthetic effect.

Figure 3:
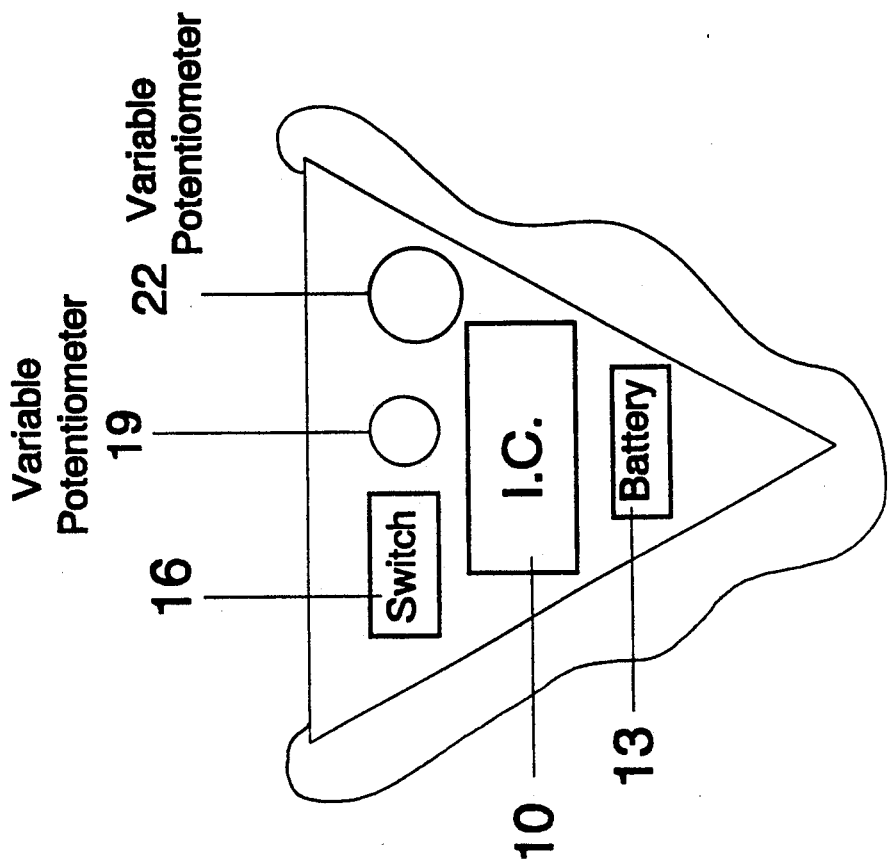
FIG. 3 represents a fragmentary view in elevation of the rear of the article of adornment shown in FIG. 2.
Figure 2:
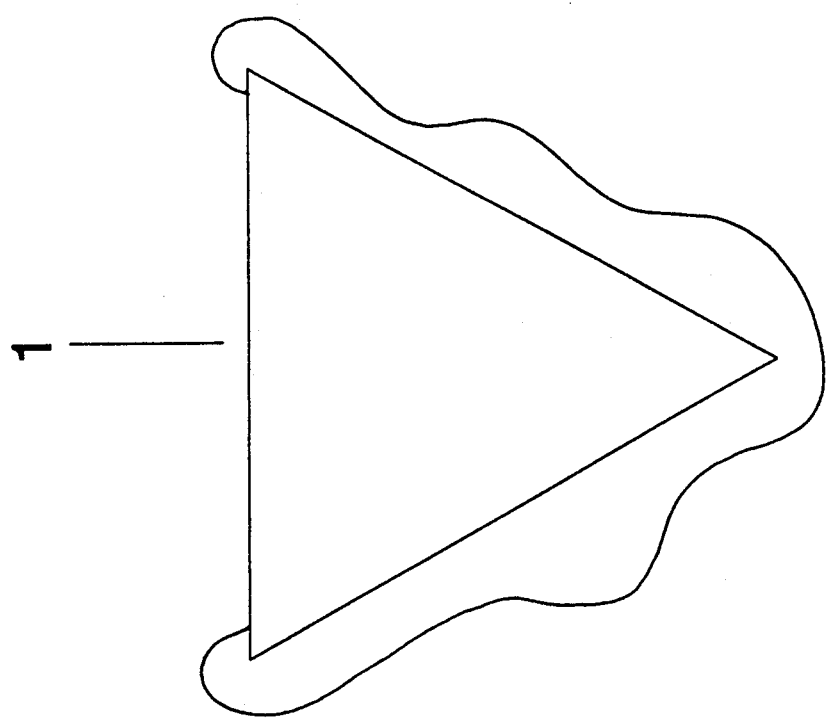
FIG. 2 represents a fragmentary view in elevation of the front of an article of adornment embodying the present invention.

In FIG. 2, a fragmentary portion of the front of an article of adornment such as pendant or earring is shown with the display cell 1 secured thereto. The integrated circuit 10 and battery 10 are secured to the area of the article as shown in FIG. 3. The wearer of the article of adornment can select the color of the display cell 1 by adjusting variable potentiometer 19 in the manner aforesaid, and can select the frequency of color changes in the display cell 1 by adjusting variable potentiometer 22. In this manner, novel aesthetic effects in the article of adornment are realized. The actual wiring between battery 13 and integrated circuit 10, between switch 16, variable potentiometers 19 and 22 and integrated circuit 10, and between integrated circuit 10 and display 1 have been omitted from FIGS. 2 and 3 for the purpose of clarity. If made necessary because of space limitations, or if desired, variable potentiometer 22 can be dispensed with, and the frequency of color change can be set, without the option of adjustability, within electronic control module 9.

In FIG. 4, a wristwatch is shown with displays 1 secured to the band and mounted on the face of the watch. Electronic control module 9 operating both displays 1 and battery 10 are mounted inside the watch casing along with the watch timing mechanism (quartz or mechanical). Switch 16 is shown as a touch-type switch that is opened or closed by repeatedly depressing it. Although not shown in FIG. 4, another rotatable knob could be provided outside the watch casing to adjust a variable potentiometer 22 in electronic control module 9 to adjust the frequency of color changes in display 1.

In FIG. 5, a shoe is shown with one or more displays 1 secured to desired outer portions thereof. Integrated circuit 10 and battery 13 are mounted in the tongue of the shoe. Variable potentiometer 19, by means of which the color of the display can be changed by the user, is mounted near the top of the tongue. Electrical wiring to the display and between other components of this invention are run inside the shoe.

Display 1 with electronic control module 9 and battery 13 can, in a similar manner, be affixed to articles of apparel. The display 1 can be in the form of a team name, for example.

Figure 6:
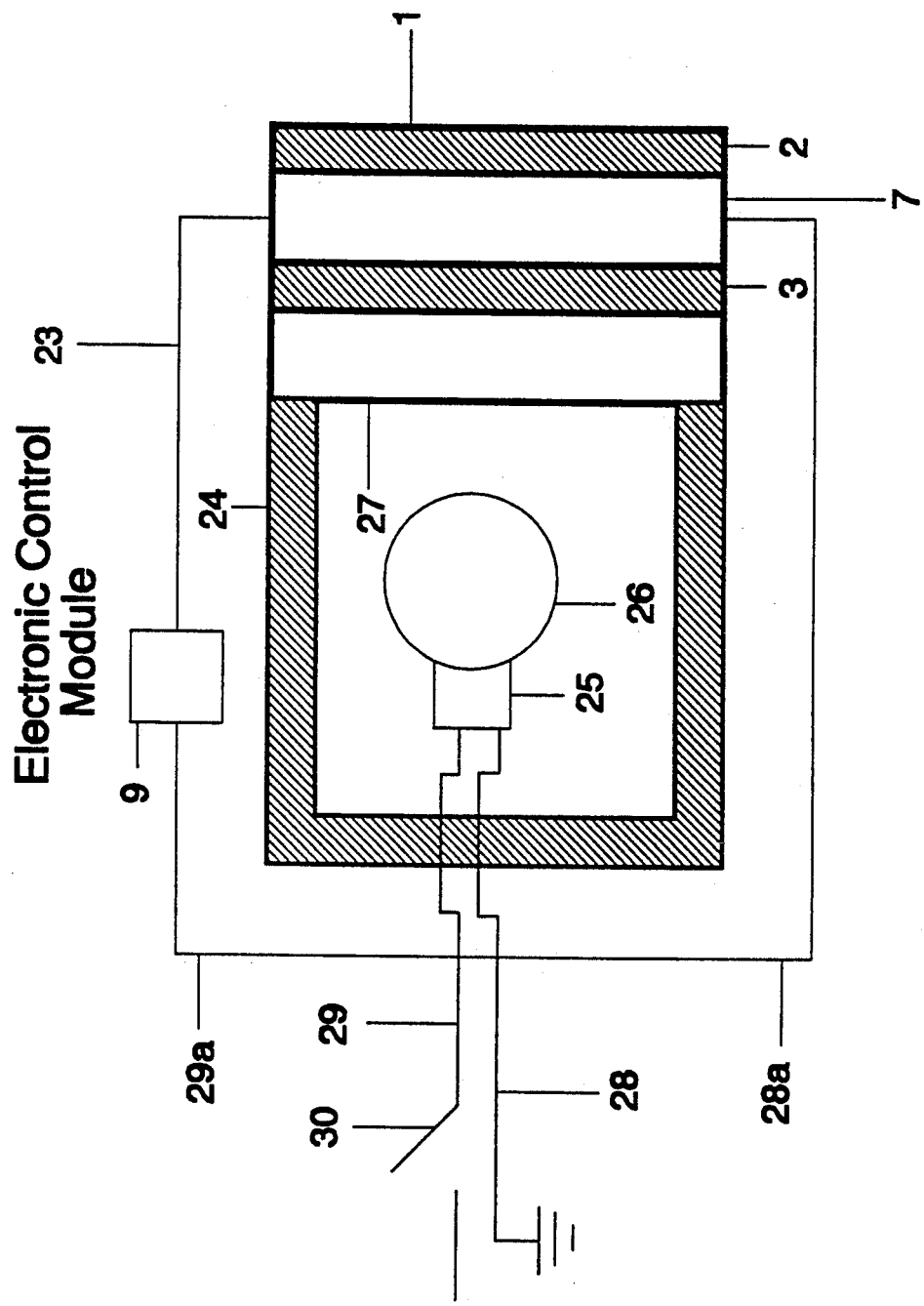
FIG. 6 represents diagrammatically a medial section through an automobile taillight assembly embodying the present invention.

In FIG. 6, an automobile taillight assembly 23 is shown diagrammatically in medial section. Conventionally, taillight assembly 23 comprises housing 24, socket 25, bulb 26, lens 27 and lines 28 and 29 leading to a source of electricity (storage battery or generator, not shown). One of lines 28 or 29 is conventionally grounded. A switch 30, activated by the brake pedal (not shown) is provided in the wiring circuit. In the conventional taillight assembly 23, lens 27 is of transparent red plastic or glass and provides a red warning light when bulb 26 is lit.

Taillight assembly 23 embodies the present invention in the following manner. Lens 27 is of clear transparent plastic or glass, and display cell 1 with transparent superstrate 2 and transparent substrate 3 is secured to the face of lens 27. As shown in FIG. 6, display cell 1 is secured to the exterior face of lens 27. Alternatively, display cell 1 could be secured to the interior face of lens 27.

Display cell 1 includes, as previously described, guest-host mixture 7 of liquid crystals containing, as guest dyes, a negative order parameter dye which changes from colorless to red when the voltage applied across display cell 1 is raised from zero volts (i.e., when the brake pedal is depressed so as to close switch 30), and a positive order parameter dye which is colored when switch 30 is open. Preferably, the positive order parameter dye exhibits the color of the automobile when switch 30 is open to create a unique aesthetic effect in which the taillight is practically invisible (i.e., undistinguishable in color from the automobile), particularly if display cell 1 is secured to the exterior face of lens 27.

Line 29a communicates between line 29 through electronic control module 9 to transparent electrode 4 on the inner face of superstrate 2. Line 28a communicates between line 28 and transparent electrode 4 on the inner face of substrate 2. Electronic control module 9 includes integrated circuit 10 which delivers a 35 Hz-square-voltage-wave-modulated RMS operating voltage to transparent electrode 4 on superstrate 2.

An example of a suitable negative order parameter dye which transmits red light of the proper wave length for this purpose when the brake pedal is depressed so as to close switch 30 is 4-heptylbenzoyloxy-1,8-bis-heptyl-benzoylamino-5-hydroxyanthraquinone.

Display cell 1 could also be secured to the lens of a yellow fog light on the automobile, in which event the negative order parameter dye in the guest-host mixture will be selected to produce a proper shade of yellow when the switch controlling the fog light is closed. An example of a suitable negative order parameter dye suitable for this purpose is 1,8-bis-(4 -heptylbenzoylamino)-4,8-bis-(valeryloxy) anthraquinone. The positive order parameter dye in the guest-host mixture will be selected to exhibit the color of the automobile when the fog light switch is open, creating a unique aesthetic effect in which the fog light will be practically invisible (i.e., undistinguishable in color from the automobile).

Display cell 1 can also be secured to the headlight of an automobile. Preferably, the positive order parameter dye in guest-host mixture 7 will exhibit the color of the automobile when the headlight switch is open, and will be substantially colorless when the headlight switch is closed to permit the white light of the headlight bulb to shine through. Because at present there is no known positive order parameter dye that will be completely colorless under an applied voltage, quest-host mixture 7 will include a small amount of a negative order parameter dye selected to absorb all of the visible wavelengths of the positive order parameter dye when the headlight switch is closed. The selection of the negative order parameter dye will depend upon the color transmitted by the positive order parameter dye (and hence upon the color of the automobile). The result is a display that slightly absorbs some of the light transmitted through the display cell 1. Thus, the light from the headlight will still appear white, although slightly dimmer than with the conventional headlight. Again, a unique aesthetic effect is realized in which the headlight will be practically invisible (i.e., undistinguishable in color from the automobile) when the headlight switch is open.

Figure 7:
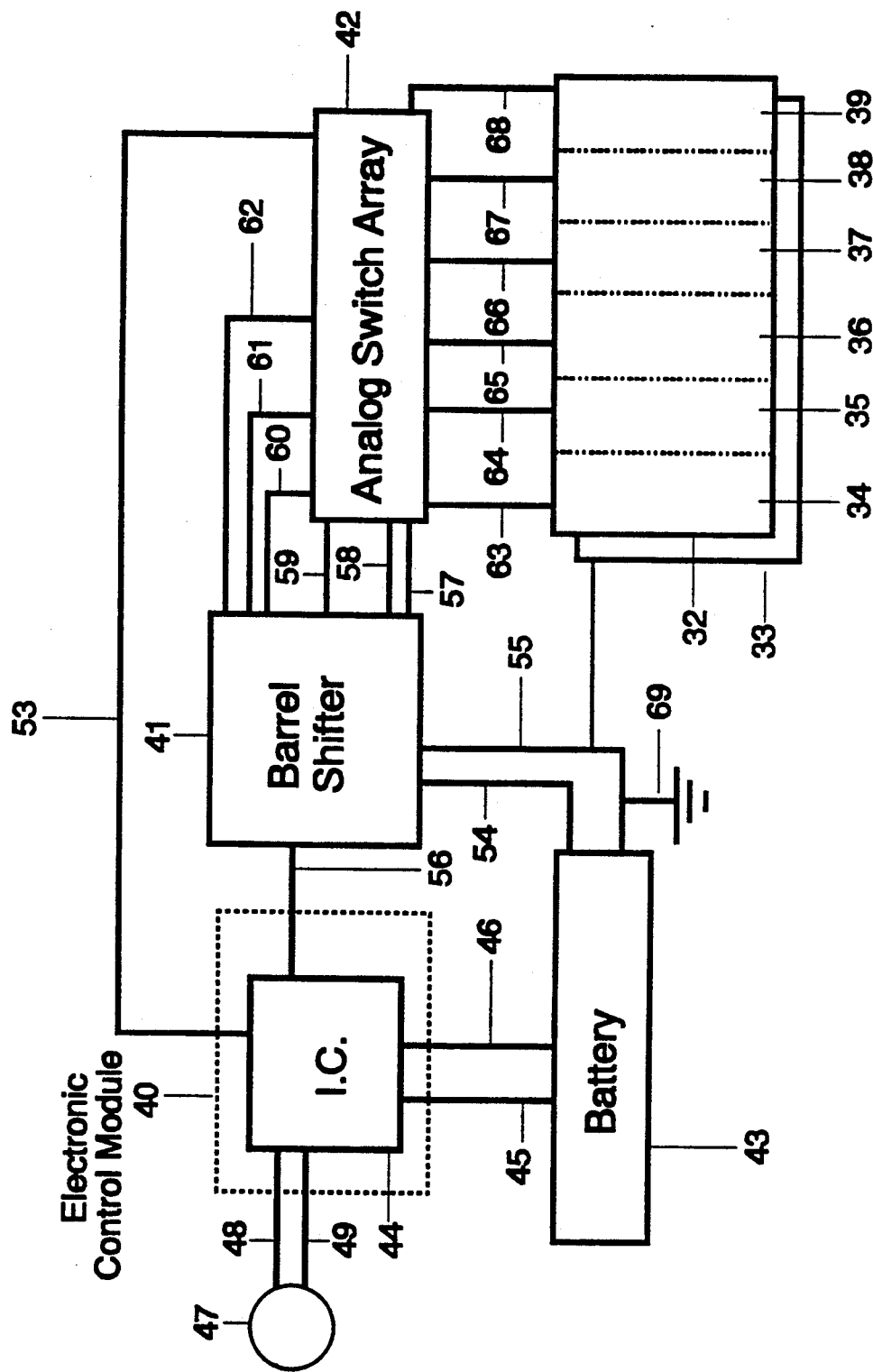
FIG. 7 represents a diagrammatic view of a display embodying the present invention, with circuitry which causes a wave of color changes to travel continuously across the face of the display.

FIG. 7 illustrates an embodiment of the invention in which a wave of color is caused to travel continuously across the face of display 31 by means of the circuitry shown as a block diagram.

Display 31 comprises superstrate 32, substrate 33, and a liquid crystal guest-host mixture itself comprising a positive order parameter dye and a negative order parameter dye interposed therebetween in the same manner as shown in FIGURE 1. For purposes of clarity, substrate 33 is shown slightly offset from superstrate 32, although it will be understood that in the actual display 31 substrate 33 will register with superstrate 32.

Superstrate 32 is provided with a number of transparent electrodes 34, 35, 36, 37, 38 and 39 each similar to transparent electrode 4 shown in FIG. 1. Transparent electrodes 34, 35, 36, 37, 38 and 39 are electrically insulated from each other by suitable means, such as spacing or insulating material between adjacent electrodes.

It is to be understood that superstrate 32 may be provided with a greater or lesser number of transparent electrodes than the six transparent electrodes 34, 35, 36, 37, 38 and 39 shown in FIG. 7.

Substrate 33 is provided with a single transparent electrode 4 in the same manner as shown in FIG. 1.

The electrical circuitry which operates display 31 to produce the continuously travelling wave of color thereacross is seen as comprising electronic control module 40, barrel shifter 41, analog switch array 42, and operating battery 43.

Electronic control module 40 is generally similar to electronic control module 9 of FIG. 1 and comprises integrated circuit 44 electrically connected to battery 43 through lines 45 and 46. Variable potentiometer 47, connected to integrated circuit 44 through lines 48 and 49 varies the RMS voltage output of the integrated circuit 44 and performs the same function as variable potentiometer 19 of FIG. 1.

Figure 10:
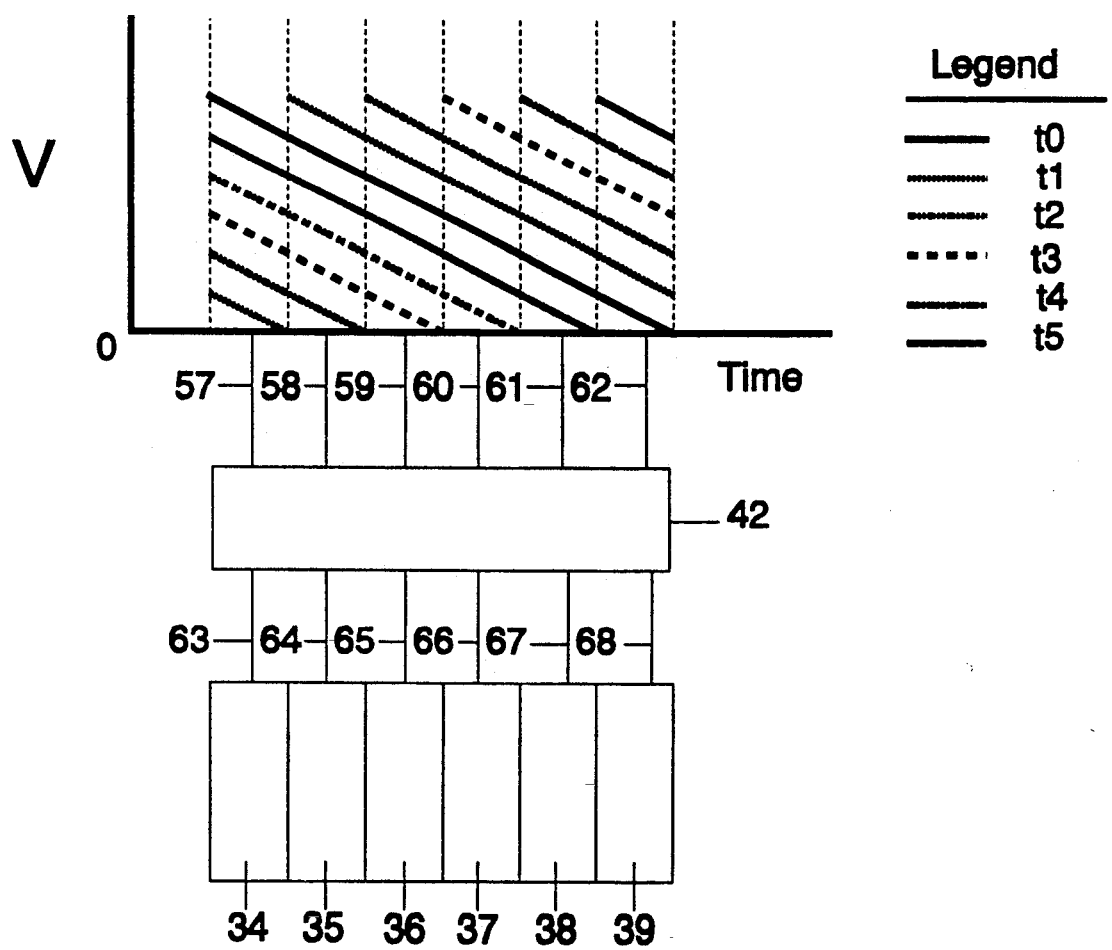
FIG. 10 represents a diagram of the triangular voltage wave produced by the integrated circuit of FIG. 8, the segments of the triangular voltage wave produced by the barrel shifter of FIG. 7, and the electrical connections to the individual transparent electrodes of the display.

Electronic control module 40 is designed to produce a triangular voltage wave, as shown in FIG. 10, of variable frequency ranging, for example, between 0.1 Hz to 10 Hz and a RMS voltage ranging between zero and a finite level of 15.6 volts, and a square voltage wave with frequency of, for example, 35 Hz. The square voltage wave is provided to prevent degradation of the liquid crystal guest-host mixture in display 31, and the triangular voltage wave is modulated by the square voltage wave.

Figure 8:
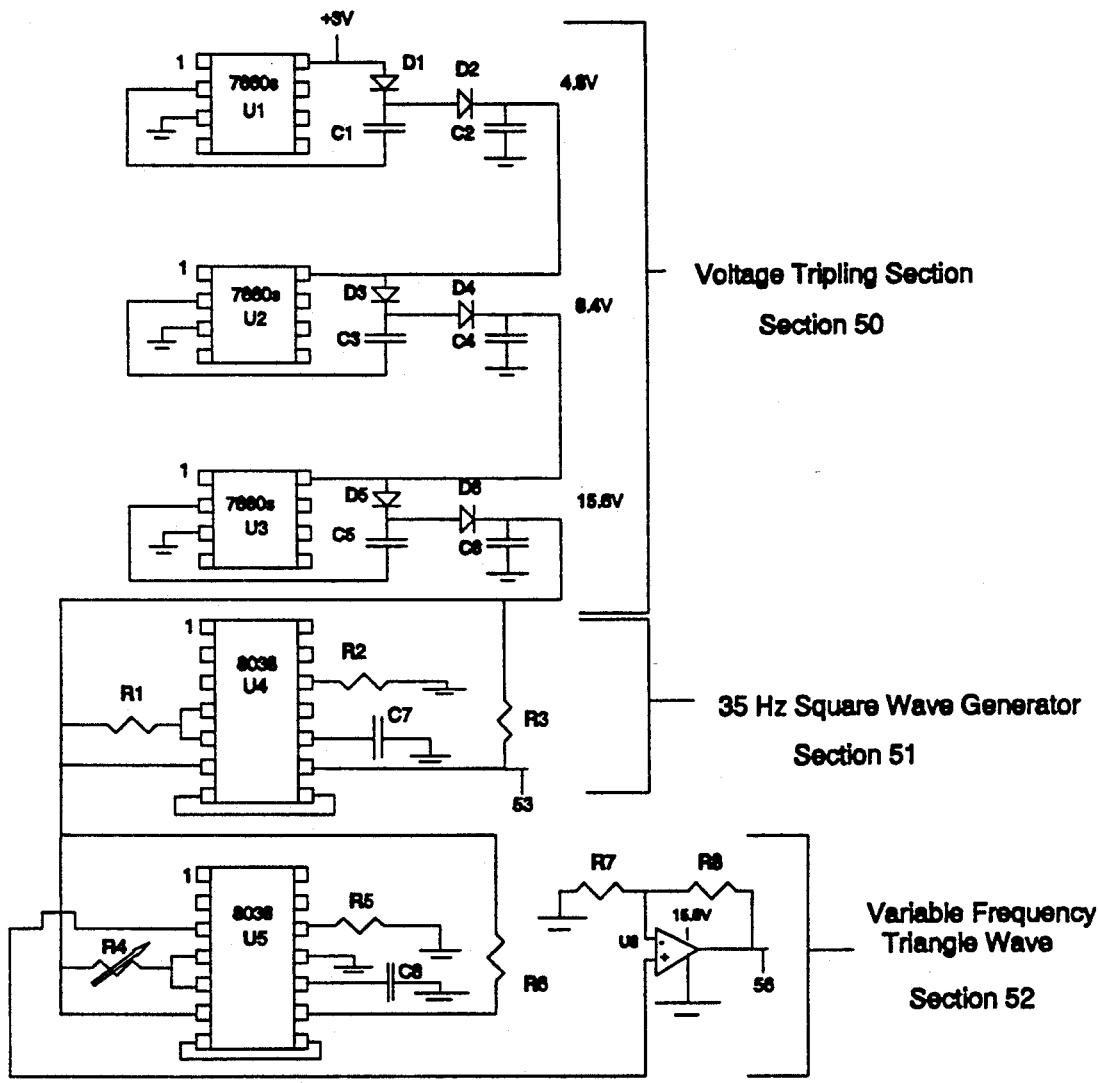
FIG. 8 represents a diagram of the preferred integrated circuit used in achieving the travelling wave of color changes in the embodiment of FIG. 7.

Preferred circuitry for the integrated circuit 44 is shown diagrammatically in FIG. 8. The values for the resistors and capacitors and identification of the semiconductors of the preferred circuitry of FIG. 8 are shown in FIG. 9.

Integrated circuit 44 comprises voltage tripling section 50 to amplify the voltage of battery 43 to a level adequate to operate display 31 satisfactorily, a square wave generator section 51 to prevent degradation of the liquid crystal guest-host mixture, and a variable frequency triangular wave generator section 52. The 35 Hz output of square wave generator section 51 is fed through line 53 to analog switch array 42 in which it modulates the voltages fed to the several transparent electrodes in display 31.

Barrel shifter 41, otherwise known as a decade divider, is preferably a 74HC4017 integrated circuit which is powered by battery 43 through lines 54 and 55, and which receives the triangular voltage wave output of integrated circuit 44 through line 56. Barrel shifter 41 divides the variable frequency triangular voltage wave generated by integrated circuit 44 into as many voltage segments as there are transparent electrodes in display 31, and these voltage segments are fed through lines 57, 58, 59, 60, 61 and 62 into analog switch array 42, in which they are modulated by the 35 Hz signal from line 53, for subsequent distribution through lines 63, 64, 65, 66, 67 and 68 to transparent electrodes 34, 35, 36, 37, 38 and 39 respectively. In the illustrated embodiment, barrel shifter 41 divides the variable frequency triangular voltage wave into six segments to correspond with the number of transparent electrodes 34, 35, 36, 37, 38 and 39 in display 1.

Battery 43 is grounded at 61 as shown. The transparent electrode 4 of substrate 33 is grounded at 70 as shown.

FIG. 10 illustrates diagrammatically the variable frequency triangular voltage wave generated by integrated circuit 44 and divided into segments by barrel shifter 41, plotted against time, the voltages corresponding to the several segments of the triangular voltage wave lines fed through lines 57, 58, 59, 60 61 and 62 to analog switch array 42 and thence through lines 63, 64, 65, 66, 67 and 68 to transparent electrodes 34, 35, 36, 37, 38 and 39 respectively.

It will be seen from FIG. 10 that the voltage fed to any one of the transparent electrodes 34, 35, 36, 37, 38 and 39 will be sequentially stepped at six intervals from maximum operating voltage to zero volts and then back to maximum operating voltage. It will also be seen that each level of voltage travels sequentially across the array of transparent electrodes 34, 35, 36, 37, 38 and 39. As previously explained in connection with FIG. 1, the transmitted color of the liquid crystal guest-host mixture between any transparent electrode and the grounded transparent electrode of substrate 33 will change, sequentially, from the full color of the negative order parameter dye at maximum voltage to the full color of the positive order parameter dye at zero voltage, with shades inbetween at intermediate voltages. In this manner, a travelling wave of color changes is produced across display 31.

Thus, if the negative order parameter dye in the liquid crystal guest-host mixture is red at full color (i.e., at maximum applied voltage), and if the positive order parameter dye in the liquid crystal guest-host mixture is yellow at full color (at zero applied voltage), the display 31 will show a band of red proceeding across the face of the display 31 followed by successive bands of orange of shades ranging from reddish-orange to yellowish orange, a band of yellow, and the sequence from red to yellow through the several shades of orange is repeated continuously, producing a novel aesthetic effect.

The velocity of the passage of the bands of color across display 31 is adjusted by adjusting variable potentiometer 47, which adjusts the frequency of the triangular voltage wave in the same manner as variable potentiometer 22 of FIG. 1.

It will be understood that, in the embodiment of FIGURE 7, a zero order parameter dye can be substituted for either the positive order parameter dye or the negative order parameter dye.

The foregoing specification is illustrative of the principles of the invention. Since modifications and changes which do not depart from the spirit of the invention may readily occur to those skilled in the art to which this invention pertains, this invention should not be considered as limited to the exact apparatus shown and described therein, and the appended claims should be construed as covering suitable modifications and equivalents.

I claim:

1. Liquid crystal display apparatus comprising:
   (a) a transparent superstrate having an interior face and an exterior face,
   (b) a substrate parallel to and spaced from said superstrate, said substrate having an interior face and an exterior face,
   (c) a first transparent electrode secured to the interior face of said superstrate,
   (d) a second transparent electrode secured to the interior face of said substrate,
   (e) liquid crystal material interposed between said first and second electrodes,
   (f) a positive order parameter dye incorporated in said liquid crystal material,
   (g) a negative order parameter dye incorporated in said liquid crystal material,
   (h) first means to generate an operating voltage wave varying between 0 volts and a level above 0 volts and to vary the frequency of said voltage wave,
   (i) second means to generate a second voltage wave of a constant high frequency above the maximum frequency of said operating voltage wave,
   (j) third means to connect the operating voltage wave and the second voltage wave to said first and second electrodes,
   (k) whereby said operating voltage wave varies the color of the display between the full color of said positive order parameter dye and the full color of said negative order parameter dye and shades of color between the full colors of said positive order parameter dye and said negative order parameter dye,
   (l) and whereby said second voltage wave prevents degradation of said liquid crystal mixture.

2. Apparatus as in claim 1, further comprising:
(m) a mixture of particulate spacer material and adhesive interposed between said first and second electrodes,
(n) whereby to maintain said superstrate and said substrate at a fixed distance apart.

3. Apparatus as in claim 1, wherein
(m) said substrate is transparent.

4. Apparatus as in claim 1, further comprising:
(m) a reflective coating applied to the exterior face of said substrate.

5. Apparatus as in claim 1, further comprising:
(m) a transreflective coating applied to the exterior face of said substrate.

6. Apparatus as in claim 1, further comprising:
(m) an opaque dye applied to the exterior face of said substrate.

7. Liquid crystal display apparatus comprising:
(a) a transparent superstrate having an interior face and an exterior face,
(b) a substrate parallel to and spaced from said superstrate, said substrate having an interior face and an exterior face,
(c) a first transparent electrode secured to the interior face of said superstrate,
(d) a second transparent electrode secured to the interior face of said substrate,
(e) liquid crystal material interposed between said first and second electrodes,
(f) a zero order parameter dye incorporated in said liquid crystal material,
(g) a second dye selected from the group consisting of positive order parameter dyes and negative order parameter dyes and incorporated in said liquid crystal material,
(h) first means to generate an operating voltage wave varying between 0 volts and a level above 0 volts and to vary the frequency of said voltage wave,
(i) second means to generate a second voltage wave of a constant high frequency above the maximum frequency of said operating voltage wave,
(j) third means to connect the operating voltage wave and the second voltage wave to said first and second electrodes,
(k) whereby said operating voltage wave varies the color of the display between the color of the zero order parameter dye and the full color of the second dye and shades of color between the color of the zero order parameter dye and the full color of the second dye,
(l) and whereby said second voltage wave prevents degradation of said liquid crystal mixture.

8. Apparatus as in claim 7, further comprising:
(m) a mixture of particulate spacer material and adhesive interposed between said first and second electrodes,
(n) whereby to maintain said superstrate and said substrate at a fixed distance apart.

9. Apparatus as in claim 7, wherein
(m) said substrate is transparent.

10. Apparatus as in claim 7, further comprising
(m) a reflective coating applied to the exterior face of said substrate.

11. Apparatus as in claim 7, further comprising:
(m) a transreflective coating applied to the exterior face of said substrate.

12. Apparatus as in claim 7, further comprising:
(m) an opaque third dye applied to the exterior face of said substrate.

13. Liquid crystal display apparatus comprising:
(a) a transparent superstrate having an interior face and an exterior face,
(b) a transparent substrate parallel to and spaced from said superstrate, said substrate having an interior face and an exterior face,
(c) a plurality of transparent first electrodes secured to and extending across the interior face of said superstrate, each of said plurality of transparent first electrodes being electrically insulated from adjacent transparent first electrodes,
(d) a second electrode secured to the interior face of said substrate,
(e) liquid crystal material interposed between said second electrode and said plurality of said electrodes,
(f) a positive order parameter dye incorporated in said liquid crystal mixture,
(g) a negative order parameter dye incorporated in said liquid crystal mixture,
(h) first means to generate a triangular voltage wave varying between 0 volts and a level above 0 volts and to vary the frequency of said triangular voltage wave,
(i) second means to generate a second voltage wave of a constant high frequency above the maximum frequency of said triangular voltage wave,
(j) third means to divide the triangular voltage wave generated by said first means into a plurality of segments corresponding in number to the plurality of first electrodes,
(k) fourth means to connected the segments of the triangular voltage wave produced by said third means to said plurality of first electrodes, each segment being connected to one of said first electrodes, and to connect the second voltage wave across said second electrode and said plurality of first electrodes,
(l) whereby each said segment of said triangular voltage wave varies the color of the liquid crystal mixture adjacent its respective first electrode between the full color of said positive order parameter dye and the full color of said negative order parameter dye and shades of color between the full color of said positive order parameter dye and said negative order parameter dye,
(m) and whereby said second voltage wave prevents degradation of said liquid crystal mixture.

14. Apparatus as in claim 13, wherein:
(n) the segments of the triangular voltage wave are connected in sequence to said plurality of first electrodes,
(o) whereby to produce a wave of color changes in the liquid crystal mixture advancing from one end to the other of said liquid crystal display apparatus.

15. Apparatus as in claim 13, further comprising:
(n) a mixture of particulate spacer material and adhesive interposed between said second electrode and said plurality of first electrodes,
(o) whereby to maintain said superstrate and said substrate at a fixed distance apart.

16. Apparatus as in claim 13, wherein:
(n) said substrate is transparent.

17. Apparatus as in claim 13, further comprising:
(n) a reflective coating applied to the exterior face of said substrate.

18. Apparatus as in claim 13, further comprising:
(n) a transreflective coating applied to the exterior face of said substrate.

19. Apparatus as in claim 13, further comprising:
(n) an opaque dye applied to the exterior face of said substrate.

20. Liquid crystal display apparatus comprising:
(a) a transparent superstrate having an interior face and an exterior face,
(b) a substrate parallel to and spaced from said superstrate, said substrate having an interior face and an exterior face,
(c) a plurality of transparent first electrodes secured to and extending across the interior face of said superstrate, each of said plurality of transparent first electrodes being electrically insulated from adjacent transparent first electrodes,
(d) a second electrode secured to the interior face of said substrate,
(e) liquid crystal material interposed between said second electrode and said plurality of first electrodes,
(f) a zero order parameter dye incorporated in said liquid crystal mixture,
(g) a second dye selected from the group consisting of positive order parameter dyes and negative order parameter dyes and incorporated in said liquid crystal material,
(h) first means to generate a triangular voltage wave varying between 0 volts and a level above 0 volts and to vary the frequency of said triangular voltage wave,
(i) second means to generate a second voltage wave of a constant high frequency above the maximum frequency of said triangular voltage wave,
(j) third means to divide the triangular voltage wave generated by said first means into a plurality of segments corresponding in number to the plurality of first electrodes,
(k) fourth means to connected the segments of the triangular voltage wave produced by said third means to said plurality of first electrodes, each segment being connected to one of said first electrodes, and to connect the second voltage wave across said second electrode and said plurality of first electrodes,
(l) whereby each said segment of said triangular voltage wave varies the color of the liquid crystal mixture adjacent its respective first electrode between the color of the zero order parameter dye and the full color of the second dye and shades of color between the color of the zero order parameter dye and the full color of the second dye,
(m) and whereby said second voltage wave prevents degradation of said liquid crystal mixture.

21. Apparatus as in claim 20, wherein:
(n) the segments of the triangular voltage wave are connected in sequence to said plurality of first electrodes,
(o) whereby to produce a wave of color changes in the liquid crystal mixture advancing from one end to the other of said liquid crystal display apparatus.

22. Apparatus as in claim 20, further comprising:
(n) a mixture of particulate spacer material and adhesive interposed between said second electrode and said plurality of first electrodes,
(o) whereby to maintain said superstrate and said substrate at a fixed distance apart.

23. Apparatus as in claim 20, wherein:
(n) said substrate is transparent.

24. Apparatus as in claim 20, further comprising:
(n) a reflective coating applied to the exterior face of said substrate.

25. Apparatus as in claim 20, further comprising:
(n) a transreflective coating applied to the exterior face of said substrate.

26. Apparatus as in claim 20, further comprising:
(n) an opaque dye applied to the exterior face of said substrate.

27. Liquid crystal display apparatus as in claim 3 and adapted to cover the clear lens of a lamp on a vehicle having a color, said lamp being operated by a switch, wherein:
(m) said positive order parameter dye exhibits the color of the vehicle when the switch is open,
(n) said negative order parameter dye is present in a concentration sufficient to absorb only the residual visible wavelengths exhibited by the positive order parameter dye when the switch is closed,
said liquid crystal display apparatus further comprising:
(o) fourth means to connect said first and second means across said switch,
(p) fifth means to secure said liquid crystal display apparatus to said lens,
(q) whereby the liquid crystal will exhibit the color of the vehicle when the switch is open thereby substantially concealing said lens, and will transmit substantially uncolored light from the lamp when the switch is closed.

28. Liquid crystal display apparatus as in claim 3 and adapted to cover the clear lens of a lamp on a vehicle having a color, said lamp and lens constituting a fog light and being operated by a switch, wherein:
(m) said positive order parameter dye exhibits the color of the vehicle when the switch is open,
(n) said negative order parameter dye is 1,8-bis-(4-heptylbenzoylamino)-4,8-bis(valeryloxy) anthraquinone,
said liquid crystal display apparatus further comprising:
(o) fourth means to connect said first and second means across said switch,
(p) fifth means to secure said liquid crystal display to said lens,
(q) whereby the liquid crystal display apparatus will exhibit the color of the vehicle when the switch is open thereby substantially concealing said lens, and will transmit a yellow color when the switch is closed.

29. Liquid crystal display apparatus as in claim 3 and adapted to cover the clear lens of a brake lamp on a vehicle having a color, said lamp being operated by a brake pedal closing a switch, wherein:
(m) said positive order parameter dye exhibits the color of the vehicle when the switch is open,
(n) said negative order parameter dye exhibits a red color when the switch is closed by the brake pedal,
said liquid crystal display apparatus further comprising:
(o) fourth means to connect said first and second means across said switch,
(p) fifth means to secure said liquid crystal display to said lens,
(q) whereby the liquid crystal display apparatus will exhibit the color of the vehicle when the switch is open thereby substantially concealing said lens, and will transmit a red color when the brake pedal is depressed to close the switch.

30. Liquid crystal display apparatus as in claim 29, wherein the negative order parameter dye is 4-heptyl-benzoyloxy-1,8-bis-heptylbenzoylamino-5-hydroxyanthraquinone.

31. Apparatus as in claim 1, wherein:
(m) said second voltage wave is a square voltage wave.

32. Apparatus as in claim 7, wherein:
(m) said second voltage wave is a square voltage wave.

33. Apparatus as in claim 13, wherein:
(n) said second voltage wave is a square voltage wave.

34. Apparatus as in claim 20, wherein:
(n) said second voltage wave is a square voltage wave.

* * * * *